(12) United States Patent
De Bossoreille et al.

(10) Patent No.: US 10,279,890 B2
(45) Date of Patent: May 7, 2019

(54) CONFIGURABLE CONTROL PANEL FOR AN AIRCRAFT COCKPIT AND METHOD OF CONFIGURATION FOR SUCH A PANEL

(71) Applicant: ZODIAC AERO ELECTRIC, Montreuil (FR)

(72) Inventors: Romain De Bossoreille, Paris (FR); Michael Nahmiyace, Nogent sur Marne (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 15/179,580

(22) Filed: Jun. 10, 2016

(65) Prior Publication Data
US 2016/0362175 A1    Dec. 15, 2016

(30) Foreign Application Priority Data

Jun. 11, 2015    (FR) ..................... 15 55327

(51) Int. Cl.
| | |
|---|---|
| *B64C 13/06* | (2006.01) |
| *B64D 43/00* | (2006.01) |
| *G01C 23/00* | (2006.01) |
| *G06F 3/041* | (2006.01) |
| *G06F 3/14* | (2006.01) |

(52) U.S. Cl.
CPC .............. *B64C 13/06* (2013.01); *B64D 43/00* (2013.01); *G01C 23/00* (2013.01); *G06F 3/041* (2013.01); *G06F 3/1423* (2013.01)

(58) Field of Classification Search
CPC ....... G06F 3/041; G06F 3/1423; B64C 13/06; B34D 43/00
See application file for complete search history.

(56) References Cited

U.S. PATENT DOCUMENTS

| | | | |
|---|---|---|---|
| 7,191,406 B1 | 3/2007 | Barber et al. | |
| 8,264,376 B1 | 9/2012 | McLoughlin et al. | |
| 2007/0008188 A1* | 1/2007 | Firra | B64D 43/00 340/973 |
| 2010/0064228 A1* | 3/2010 | Tsern | G06F 3/1415 715/740 |
| 2013/0261851 A1* | 10/2013 | Komer | G06F 3/0488 701/3 |
| 2014/0207314 A1* | 7/2014 | Kou | B64D 43/00 701/14 |

FOREIGN PATENT DOCUMENTS

WO   WO 2007/005658 A2   1/2007

\* cited by examiner

*Primary Examiner* — Liliana Cerullo
(74) *Attorney, Agent, or Firm* — Morgan, Lewis & Bockius LLP

(57) ABSTRACT

A configurable control panel for an aircraft cockpit includes a set of universal control modules each comprising at least one screen including at least one manually manipulable control key. Each of the control modules further includes at least one master control module, and at least one universal slave module associated with the master module, and including a screen and at least one control key. The at least one master module is configured to control the screen and the at least one control key of the at least one universal slave module.

14 Claims, 2 Drawing Sheets

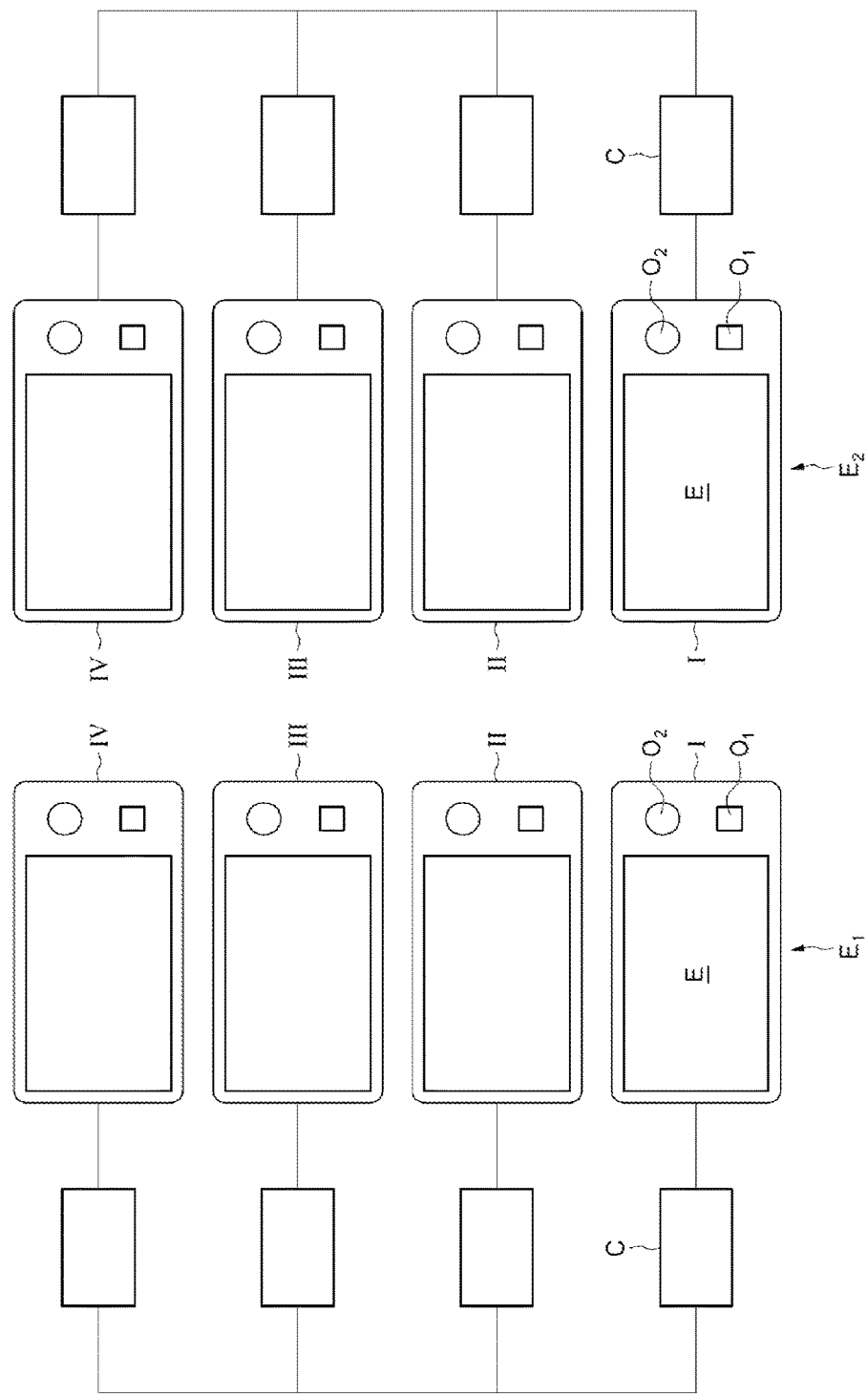

CONFIGURABLE CONTROL PANEL FOR AN AIRCRAFT COCKPIT AND METHOD OF CONFIGURATION FOR SUCH A PANEL

CROSS-REFERENCE TO RELATED APPLICATION

This application claims priority under 35 U.S.C. 119(a) to French Patent Application No. 1555327 filed on Jun. 11, 2015, which is incorporated herein by reference in its entirety for all purposes.

TECHNICAL FIELD

This disclosure relates generally, to cockpit control panels for an aircraft and more specifically, in an advantageous but non-limiting aspect, to an overhead control panel of an aircraft cockpit, situated above the pilot and/or the co-pilot.

BACKGROUND

Current control panels for cockpits generally include a number of control mechanisms referred to as human-machine interfaces of various natures, e.g., human-machine interfaces of the rotary knob type, push button type, switch type or other similar type, which are manually manipulable by the pilot and by the co-pilot for the control of a function and/or the closed-loop control of onboard systems configured to perform various functions (functional systems).

The current control panels for cockpits are dedicated to the control of a function or to the closed-loop control of a predetermined system, to the extent one exists, for each of the systems with which the pilot or the co-pilot of the aircraft interacts. A specific control panel generally includes one or more activation components dedicated to the system or to the function being controlled.

Thus, the activation components and more generally the control panels for cockpits include information and indications which, are fixed by being etched during the manufacturing process onto gauge-glass luminaires or illuminated front faces, and dedicated to the controlled functions and systems. The information and indications correspond to states of components of an aircraft system to which a control panel 1 is assigned.

The customization or the configuration of the control panels for cockpits, for example, in order to assign them to other systems or in order to add other functionalities to them, is only possible by changing components that are mechanically integrated and wired into the control panels. These modifications are therefore very constraining and very costly since they require the deployment and the intervention of qualified operatives, together with the fabrication of new components.

The above information disclosed in this Background section is only for enhancement of understanding of the background and therefore it may contain information that does not form art that is already known in this country to a person of ordinary skill in the art.

SUMMARY

Accordingly, in consideration of the above constraints, various embodiments of this disclosure are directed to providing a control panel for a cockpit that is configurable or customizable, furthermore allowing the number of components in an aircraft cockpit and of associated cabling to be reduced.

In accordance with some embodiments, a configurable control panel for an aircraft cockpit includes a set of universal control modules, each including at least one screen including at least one manually manipulable control key. Each of the control modules further includes at least one master control module, and at least one universal slave module associated with the master module, and including a screen and at least one control key. The at least one master module is configured to control the screen and the at least one control key of the at least one universal slave module.

The components are thus rendered universal for activation of various functions that are attached to various systems.

In some embodiments, the at least one control key of the at least one master module is configured to select functional systems to be controlled by the control panel, and the at least one slave module is adapted based on the functional systems selected.

In some embodiments, the control panel further includes at least one non-configurable control module to control a function of a system of the control panel.

In some embodiments, the at least one master control module and slave control module include at least one controller including a control algorithm for the control panel.

In some embodiments, the controller of the at least one slave control module is configured to control a display on the screen of the at least one slave control module and to configure the at least one control key of the slave control module according to a function dictated by the master control module.

In some embodiments, the at least one control key is a key selected from the group consisting of a digital control key and an electromechanical control key.

In some embodiments, the at least one screen of the set of universal control modules is a touch screen.

In some embodiments, the at least one screen of the set of universal control modules is a non touch-sensitive screen.

In accordance with some embodiments, a method of configuration of a configurable control panel for an aircraft includes manipulating least one master control module for selection of a system configured to perform a function controllable by the control panel, and controlling, by a controller, of at least one screen and at least one control key of a set of slave control modules according to the functional system selected. The control panel includes a set of universal control modules each comprising at least one screen and at least one manually manipulable control key. Each of the control modules further includes the at least one master control module, and at least one of the slave control modules associated with the at least one master module. The at least one slave control module includes the at least one screen and the at least one control key. The at least one master control module is configured to control the at least one screen and the at least one control key of the at least one slave control module.

The methods and apparatuses of the various embodiments have other features and advantages which will be apparent from or are set forth in more detail in the accompanying drawings, which are incorporated herein, and the following Detailed Description, which together serve to explain certain principles of the various embodiments of this disclosure.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

FIG. 2 is a schematic diagram of a part of the control panel in FIG. 1, in accordance with some embodiments.

Figure 1:
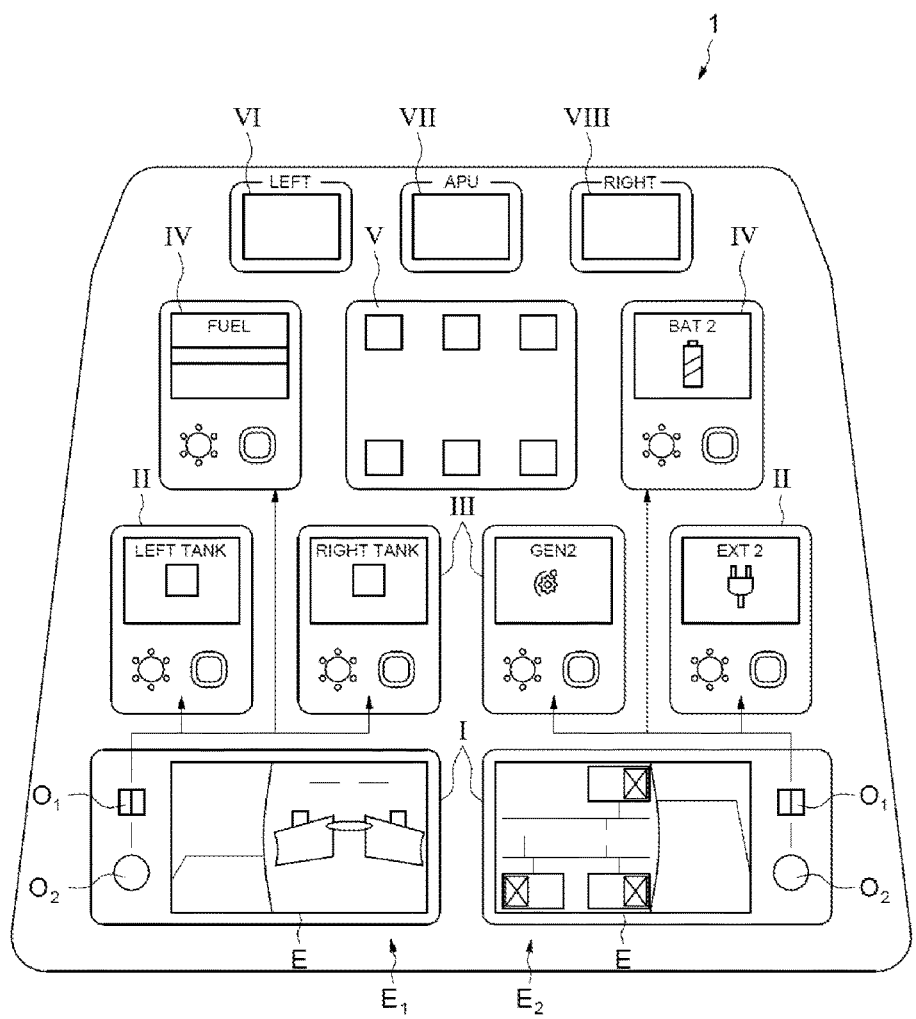
FIG. 1 is a general view of a configurable control panel for an aircraft in accordance with some embodiments.

It should be understood that the appended drawings are not necessarily to scale, presenting a somewhat simplified representation of various features illustrative of the basic principles of the various embodiments of this disclosure. The specific design features of the various embodiments as disclosed herein, including, for example, specific dimensions, orientations, locations, and shapes will be determined in part by the particular intended application and use environment.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first pair could be termed a second pair, and, similarly, a second pair could be termed a first pair, without departing from the scope of the various described embodiments. The first pair and the second pair are both pairs, but they are not the same pair.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

FIGS. 1 and 2 illustrate a control panel 1 for an aircraft in accordance with some embodiments. The control panel 1 is for example, but not exclusively limited to, a control panel of an aircraft cockpit overhead control unit, i.e., a control panel designed to be positioned above the head of the pilot and/or of the co-pilot.

As illustrated in FIG. 1, the control panel comprises a set of control modules each comprising a screen E which is for example, a touch screen or otherwise, associated with a control mechanism, for example, control keys $O_1$, $O_2$, and providing, notably, the selection of information presented on the screen E, the configuration or the closed-loop control of functional systems controlled by the control panel 1 and the control of one or of several functions of the systems of the aircraft.

In some embodiments, the control panel 1 includes two sets E1 and E2 of control modules designed respectively for the display of information and for the control of functions by the pilot and/or the co-pilot. As illustrated in FIGS. 1 and 2, each set of control modules E1, E2 includes four control modules. However, the various embodiments are not limited to the aforementioned configuration. Thus, the scope of the various embodiments is not exceeded when the control panel 1 includes a different number of control modules or of groups of control modules.

The control modules E1, E2 may be universal control modules capable of providing the control of all of the functional systems that are controllable by the control panel 1.

In some embodiments, each set of control modules includes a master control module I and three slave control modules II, III, and IV that are each configurable by the master control module I. As shown in FIG. 2, and as previously indicated, each master control module I or slave control module II, III, IV includes a screen E associated with two control keys such as $O_1$ and $O_2$, of the digital or electromechanical type, and with a controller C. The control keys are, for example, a rotary knob, a push button, or any other such part that the pilot and/or co-pilot presses or manipulates to carry out a specific control function. The controllers are connected together so that the controllers (e.g., controller C) of the slave modules are each connected to the controller C of the master control module I.

In some embodiments, the controllers C are integrated into the master and slave control modules or shared between several master and/or slave control modules. The controllers C may furthermore be installed elsewhere in the control panel 1. The controllers C, in some embodiments, take the form of one or of several computers. The controllers C incorporate a control algorithm, stored in memory, duly programmed for configuring the display on the screen E and for configuring or customizing the control keys.

With reference to FIGS. 1 and 2, under the control of the controller C, the control panels 1 are designed to generate the display, for example in the form of a scrolling menu, of all of the functional systems that are controllable by the control panel 1. By manipulating the control key, e.g., rotary knob $O_2$, the pilot or the co-pilot selects one of the functional systems then validates the selection by means of the control buttons $O_1$.

This selection causes the display, on the screen E of the master control module, of a certain quantity of general information relating to the functional system selected. Furthermore, the master control module I configures the slave control modules II, III, IV according to the functional system selected. This involves, on the one hand, configuring the display of information on screen E of each slave control module and configuring the behavior of each of the control mechanisms (e.g., control keys) $O_1$ and $O_2$ of the slave modules according to the functional system selected. In order to implement this configuration, it could be provided for the master control module I to send a configuration control signal to the controller C of the slave module in question for implementing an algorithm stored in memory designed to cause the configuration of this slave module.

In some embodiments, the functional system selected is the system for supplying the plane with fuel. Thus, information relating to the state of the refueling system is presented on screen E of the master control module I. The information could for example be the instantaneous fuel consumption and the quantity of fuel remaining in each fuel tank, for example, "LEFT TANK" and "RIGHT TANK," of the plane. The information is detailed on the screen of the slave control modules II and III. Additional "FUEL" functionalities relating to the fuel supply system could be detailed on the third slave control module III which could each in their turn be controlled.

In some embodiments, with respect to the other set of control modules $E_2$, the functional system selected is the system for supplying the plane with electricity. The information presented on screen E of the master control module is detailed on the screen of each slave control module (GEN2, EXT2 and BAT2) such that each function may be separately controlled.

The control panel 1 thus includes a certain number of universal control modules organized in the form of master and slave control modules which are each capable of controlling a set of functions.

Thus, in contrast to conventional control panels, where each control panel is dedicated to a single function, the slave control modules are universal modules, able to be used for all of the functions that are controllable by the control panel 1, and are each designed for controlling several functions selected from the master module I. This allows control panel 1 to be configurable and to provide additional visual information and functionalities. The configuration of control panel 1 may include reconfiguring the states of the functional systems depending on the actions or changing the mode of presentation of information, for example by presenting a flashing display or by changing the color of certain types of sensitive information.

The various embodiments also provide the advantage of reducing the number of control modules and, as a consequence, reducing the amount of wiring.

It is also possible to customize and to update the control panels of the aircraft by applying software updates to the controller, for example in order to offer additional options or translations.

The various embodiments furthermore allow the preparation and the adaptation of the aircraft for a specific mission by adapting the configuration of the various modules to the mission. The control panels may additionally be duplicated and synchronized in order to enable simultaneous or even synchronized, interactions, hardware redundancy and enhanced data processing security.

In some embodiments, control panel 1 may furthermore be reconfigured automatically or manually in the case of a fault, in the case of problem of availability, or in accordance with the phases of a mission. The reconfiguration may, for example, include the reconfiguration of control panel 1 in the case of a fault or of a problem of availability of one of the control modules in such a manner as to share the functionalities over the remaining control modules. For example, for a cockpit control panel including several master control modules I, each driving several slave modules II, II, IV, in the case of a fault or of unavailability of a master module I, the function of the defective master module I could be re-assigned to another module, for example to another master module. The aforementioned reconfiguration also applies in the case of the functionalities assigned to a slave module which could be re-assigned to another slave module.

In some embodiments, as shown in FIG. 1, control panel 1 may be completed by a certain number of non-configurable control modules allowing a direct access to certain functions. Control panel 1 may thus include a first non-configurable panel V including a certain number of control keys, as illustrated in FIG. 1, six in number, for the execution of a certain number of specific functions. The control keys of the non-configurable panel V may for example be for control of the jettison of kerosene in the case of an emergency landing, management of the oxygen masks, controlling the evacuation of the plane, and the like.

In some embodiments, as illustrated in FIG. 1, three non-configurable control modules VI, VII, and VIII are provided for the management of functions in the case of fire.

In accordance with some embodiments, a method of configuration of control panel 1 includes manipulating the master control module I for selection of a functional system configured to perform a function which is controlled by the control panel 1, and controlling, by the controller C, of at least one screen E and at least one control key, e.g., $O_1$, $O_2$, of the set of slave control modules II, II, IV according to the functional system selected. Control panel 1 includes a set of universal control modules $E_1$, $E_2$, each comprising at least one screen E, and including at least one manually manipulable control key $O_1$, $O_2$. Each of the control modules further includes the at least one master control module I, and at least one of the slave control modules II, II, IV associated with the at least one master module I. The at least one slave control module II, III, IV includes the at least one screen E and the at least one control key. The at least one master control module I is configured to control the at least one screen E and the at least one control key $O_1$, $O_2$ of the at least one slave control module.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A configurable control panel for an aircraft cockpit, comprising:

a master interface comprising a master controller, a screen, and one or more mechanical or electro-mechanical controls for receiving user input; and two or more slave interfaces, including first and second slave interfaces, electrically coupled with the master interface, each slave interface comprising: a screen, one or more mechanical or electro-mechanical controls for receiving user input, and a slave controller to configure the screen and the one or more mechanical or electro-mechanical controls of the slave interface based on a control signal from the master controller, wherein:

the master controller is configured to, in response to receiving a user input for display of a first functional system of an aircraft:

display first information for the first functional system of the aircraft; and send a control signal to the respective slave controllers of the first and second slave interfaces to display the first functional system of the aircraft; and the control signal causes the respective slave controllers of the first and second slave interfaces to configure the respective screens of the first and second slave interfaces for displaying second information for the first functional system of the aircraft, wherein the second information displayed by the first and second slave interfaces details the first information displayed by the master interface for the first functional system of the aircraft, the second information including additional functionalities relating to the first functional system not included in the first information.

2. The control panel of claim 1, wherein:
the first information for the first functional system of the aircraft indicates an overall state of the first functional system; and
the second information for the first functional system of the aircraft includes information for first and second distinct components of the first functional system.

3. The control panel of claim 2, wherein the control signal further causes the respective slave controllers of the first and second slave interfaces to configure behavior of the one or more mechanical or electro-mechanical controls of the first and second slave interfaces for the displayed second information.

4. The control panel of claim 3, wherein the one or more mechanical or electro-mechanical controls of the first and second slave interfaces are used to control the first and second distinct components of the first functional system, respectively.

5. The control panel of claim 1, further comprising another interface to control a second functional system of the aircraft.

6. The control panel of claim 1, wherein the screen of the master interface and the screen of each slave interface are touch-sensitive.

7. The control panel of claim 1, wherein the first functional system of the aircraft is selected from the group consisting of: a system for supplying the aircraft with fuel, and a system for supplying the aircraft with electricity.

8. A method comprising:
at a control system for an aircraft, the control system including: (i) a master interface comprising a master controller, a screen, and one or more mechanical or electro-mechanical controls for receiving user input, and (ii) two or more slave interfaces, including first and second slave interfaces, electrically coupled with the master interface, each slave interface comprising: a screen, one or more mechanical or electro-mechanical controls for receiving user input, and a slave controller to configure the screen and the one or more mechanical or electro-mechanical controls of the slave interface based on a control signal from the master controller:
receiving, at the master interface, a user input for display of a first functional system of the aircraft;
in response to receiving the user input:
displaying, on the screen of the master interface, first information for the first functional system of the aircraft; and
sending, by the master controller, a control signal to the respective slave controllers of the first and second slave interfaces to display the first functional system of the aircraft; and
in response to sending the control signal:
configuring, by the respective slave controllers of the first and second slave interfaces, the respective screens of the first and second slave interfaces for displaying second information for the first functional system of the aircraft, wherein the second information displayed by the first and second slave interfaces details the first information displayed by the master interface for the first functional system of the aircraft, the second information including additional functionalities relating to the first functional system not included in the first information.

9. The method of claim 8, wherein:
the first information for the first functional system of the aircraft indicates an overall state of the first functional system; and
the second information for the first functional system of the aircraft includes information for first and second distinct components of the first functional system.

10. The method of claim 9, further comprising:
in response to sending the control signal:
configuring, by the respective slave controllers of the first and second slave interfaces, behavior of the one or more mechanical or electro-mechanical controls of the first and second slave interfaces for the displayed second information.

11. The method of claim 10, wherein the one or more mechanical or electro-mechanical controls of the first and second slave interfaces are used to control the first and second distinct components of the first functional system, respectively.

12. The method of claim 8, wherein the control system further comprises another interface to control a second functional system of the aircraft.

13. The method of claim 8, wherein the screen of the master interface and the screen of each slave interface are touch-sensitive.

14. The method of claim 8, wherein the first functional system of the aircraft is selected from the group consisting of: a system for supplying the aircraft with fuel, and a system for supplying the aircraft with electricity.

* * * * *